US012685951B2

(12) United States Patent
Chen et al.

(10) Patent No.: US 12,685,951 B2
(45) Date of Patent: Jul. 21, 2026

(54) POROUS STRUCTURE SUCH AS FOR FILTERS, AND MAKING THE SAME

(71) Applicant: CORNING INCORPORATED, Corning, NY (US)

(72) Inventors: Guohua Chen, Painted Post, NY (US); Weimin Hou, Shanghai (CN); He Jing, Painted Post, NY (US); Jia Liu, Painted Post, NY (US); Jianguo Wang, Shenzhen (CN); Qing Zhou, Shanghai (CN)

(73) Assignee: CORNING INCORPORATED, Corning, NY (US)

( * ) Notice: Subject to any disclaimer, the term of this patent is extended or adjusted under 35 U.S.C. 154(b) by 208 days.

(21) Appl. No.: 17/913,479

(22) PCT Filed: Apr. 7, 2020

(86) PCT No.: PCT/CN2020/083460
§ 371 (c)(1),
(2) Date: Sep. 22, 2022

(87) PCT Pub. No.: WO2021/203232
PCT Pub. Date: Oct. 14, 2021

(65) Prior Publication Data
US 2023/0136926 A1    May 4, 2023

(51) Int. Cl.
*B01D 39/20*      (2006.01)
*B01D 46/24*      (2006.01)
(Continued)

(52) U.S. Cl.
CPC ... *B01D 39/2013* (2013.01); *B01D 46/24491* (2021.08); *B01D 46/2482* (2021.08);
(Continued)

(58) Field of Classification Search
CPC .............................. C03C 11/002; C03C 3/076
See application file for complete search history.

(56) References Cited

U.S. PATENT DOCUMENTS 4,871,693 A * 10/1989 Inoue ....................... B01J 21/14
                                                        501/12
5,403,787 A * 4/1995 Day .................... C04B 38/0006
                                                        501/39
(Continued)

FOREIGN PATENT DOCUMENTS

CN        107663024 A * 2/2018 ............. C03B 19/02
CN        108558437 A    9/2018
(Continued)

OTHER PUBLICATIONS

International Search Report and Written Opinion of the International Searching Authority; PCT/US2022/047524; mailed on Feb. 20, 2023, 12 pages; European Patent Office.
(Continued)

*Primary Examiner* — Erin Snelting
*Assistant Examiner* — Steven S Lee
(74) *Attorney, Agent, or Firm* — Irene L Brookins

(57)    ABSTRACT

A method of making a porous structure configured for use in a particulate filter includes bonding a plurality of glass bubbles to one another, and breaching the plurality of glass bubbles. Voids within individual breached glass bubbles open into one another to form cavities that extend through the porous structure.

17 Claims, 6 Drawing Sheets

(51) Int. Cl.

| | |
|---|---|
| *C03B 19/06* | (2006.01) |
| *C03B 19/10* | (2006.01) |
| *C03B 32/02* | (2006.01) |
| *C03C 11/00* | (2006.01) |

(52) U.S. Cl.

CPC .......... *B01D 46/2484* (2021.08); *C03B 19/06* (2013.01); *C03B 19/107* (2013.01); *C03B 32/02* (2013.01); *C03C 11/002* (2013.01); *B01D 2239/0478* (2013.01); *B01D 2239/1241* (2013.01); *B01D 2239/125* (2013.01)

(56) References Cited

U.S. PATENT DOCUMENTS

| | | | |
|---|---|---|---|
| 5,458,709 A | 10/1995 | Kamezaki et al. | |
| 6,444,162 B1 * | 9/2002 | Anshits | C04B 38/08 |
| | | | 264/43 |
| 7,135,140 B2 | 11/2006 | Shinohara et al. | |
| 10,370,304 B2 * | 8/2019 | Beall | C03B 19/066 |
| 2002/0180117 A1 * | 12/2002 | Yamamoto | B01D 46/24491 |
| | | | 428/116 |
| 2010/0040881 A1 * | 2/2010 | Beck | C03B 19/1075 |
| | | | 65/21.4 |
| 2011/0152056 A1 * | 6/2011 | Qi | C03B 19/107 |
| | | | 501/39 |
| 2013/0165542 A1 * | 6/2013 | Amos | C08K 7/28 |
| | | | 521/143 |
| 2016/0207817 A1 * | 7/2016 | Hojaji | C08K 7/28 |
| 2017/0096360 A1 * | 4/2017 | Hojaji | C03C 11/002 |
| 2018/0118610 A1 * | 5/2018 | Hanawa | B33Y 80/00 |
| 2018/0215644 A1 * | 8/2018 | Doering | C03C 11/002 |

FOREIGN PATENT DOCUMENTS

| | | | | |
|---|---|---|---|---|
| CN | 109095948 A | * | 12/2018 | C04B 35/10 |
| CN | 109467314 A | | 3/2019 | |
| CN | 109796134 A | | 5/2019 | |
| CN | 111393155 A | | 7/2020 | |
| CN | 112430123 A | | 3/2021 | |
| EP | 0508821 A2 | | 10/1992 | |
| FR | 2973025 A1 | * | 9/2012 | C03B 19/108 |
| JP | S63159267 A | * | 7/1988 | |
| JP | 09-002884 A | | 1/1997 | |
| KR | 101328998 B1 | * | 11/2013 | |
| KR | 10-1902591 B1 | | 9/2018 | |
| RU | 2196119 C2 | * | 1/2003 | |
| TW | I422554 B | * | 1/2014 | |
| WO | 2010/120977 A1 | | 10/2010 | |
| WO | 2021/203232 A1 | | 10/2021 | |

OTHER PUBLICATIONS

P. Thunis, et al., "Urban PM2.5 Atlas: Air Quality in European cities". Italy, European Commission, Joint Research Centre, 2017, 188 pages.

"Ambient (outdoor) air pollution", Retrieved from: https://www.who.int/news-room/fact-sheets/detail/ambient-(outdoor)-air-quality-and-health, 2022, 5 pages.

"Ambient (outdoor) air pollution", World Health Organization, Sep. 2021.

International Search Report and Written Opinion of the International Searching Authority; PCT/CN2020/083460; Mailed Jan. 7, 2021; 19 Pages; National Intellectual Property Administration.

Korean Patent Application No. 10-2020-7027002, Notice of Allowance dated Aug. 3, 2021, 2 pages (Original Document only); Korean Patent Office.

P.J. Landrigan et al., "The Lancet Commission on pollution and health." The Lancet, vol. 391(10119), 2017, pp. 462-512.

Dipankar et al., "Uniaxial quasistatic and dynamic compressive response of foams made from hollow glass microspheres", Journal of the European Ceramic Society vol. 36, No. 3, Oct. 27, 2016, pp. 781-789.

European Patent Application No. 20930122.5 Communication pursuant to Article 94(3) EPC dated May 9, 2025; 4 Pages; European Patent Office.

Chinese Patent Application No. 202111268788.0 , Office Action dated Apr. 9, 2026, 5 pages (English Translation only), Chinese Patent Office.

\* cited by examiner

310

POROUS STRUCTURE SUCH AS FOR FILTERS, AND MAKING THE SAME

This application claims the benefit of priority under 35 U.S.C. § 371 of International Application No. PCT/CN2020/ 083460, filed on Apr. 7, 2020, the content of which is relied upon and incorporated herein by reference in its entirety.

BACKGROUND

Aspects of the present disclosure generally relate to structures formed from glass bubbles that have been breached, and which may be used with filters.

Tiny glass bubbles, also called microballoons or hollow glass "microspheres," are commercially available, such as from Dennert Forayer GmbH, 3M, Zhongke Yali Technology, Ltd, Fibre Glast Developments Corp., Potters Industries LLC, and others. Such glass bubbles may be used as filler in composite materials, such as concrete.

Glass bubbles can be characterized by "diameter," where diameter refers to the diameter if volume of the glass bubble was arranged in a perfect spherical geometry. In practice, however, glass bubbles may only be generally spherical, such as having a potato-shape, for example. Size of glass bubbles may be selected and characterized based on the diameter, where "D50" particle size corresponds to a 50% pass point of glass bubbles having a diameter of the D50 value, where half in a group are larger and half are smaller in diameter than the D50 value. Likewise, "d50" corresponds to a 50% pore size of a porous structure, and d10 corresponds to a 10% pass point, as measured by ASTM standard with mercury intrusion. Accordingly, the ratio of (d50–d10)/d50 provides insight into pore size.

Glass bubbles are generally fragile and conventional practices teach methods to prevent breakage of the glass bubbles so as to maintain internal closed cavities of the glass bubbles, preserving the correspondingly low weight-to-volume relationships that glass bubbles may provide. When integrity of the glass bubbles is maintained, the glass bubbles may be integrated in composite materials for buoyant, load-bearing structures, such as surf boards or supports for offshore drilling equipment.

SUMMARY

Despite their conventional uses, Applicants discovered glass bubbles may be arranged and processed to make particularly efficient porous structures with open porosity, such as for filters. Structures with open porosity may be formed from tightly packing glass bubbles together, bonding the glass bubbles to one another and also breaching (e.g., breaking, popping, fracturing, opening, exposing hollow cores thereof) the glass bubbles. Voids of the individual glass bubbles open into one another to form porous cavities that extend and interconnect through the overall structure and may open to surfaces thereof. Such structures may be particularly useful with filters, or may be used for other purposes, such as providing a glass skeleton infiltrated with polymer, for example.

In some embodiments, a method of making a porous structure, which is configured for use in a filter, includes steps of breaching a plurality of glass bubbles (e.g., at least 100, at least 1000, at least 10,000 glass bubbles) and bonding the plurality of glass bubbles to one another. In aggregate, the bonded, breached glass bubbles form the porous structure, where voids within individual breached glass bubbles open into one another to form cavities that extend through the porous structure and to surfaces thereof. In some such embodiments, the breaching includes expanding gasses within the glass bubbles to rupture the glass bubbles. In other such embodiments, the breaching includes devitrification of glass of the glass bubbles, where softening and movement of amorphous glass relative to the devitrified glass ruptures the glass bubbles. In other such embodiments, the method includes a step of heating the plurality of glass bubbles to at least a softening temperature of amorphous glass of the glass bubbles. The heating may be such that adjoining glass bubbles sinter to one another. The breaching may occur concurrently during the heating. In some embodiments, the method includes a step of cooling the plurality of glass bubbles with adjoining glass bubbles physically bonded directly to one another. Timing and temperatures of the heating and/or cooling may devitrify at least some of the glass of the glass bubbles so that crystals form. Applicants believe that devitrification may aid in rupture of the glass bubbles, such as by limiting shrinkage of glass bubbles under negative core pressures.

In some such embodiments, prior to the heating step, the method of making a porous structure includes a step of extruding green material that includes the glass bubbles and an organic binder. Most of the glass bubbles survive the extruding without fracturing. In some such embodiments, heating burns out or chemically changes most of the organic binder in terms of weight from the porous structure. During the heating, the glass bubbles are heated at a temperature increased from ambient temperature to a first temperature with a first dwell time, then the temperature is increased from the first temperature to a second temperature with a second dwell time. The first temperature may be in a range from 300° C. to 400° C. and the first dwell time may be in a range from 1 to 10 hours. In some such embodiments, the second temperature is from 600° C. to 1200° C. and the second dwell time is from 1 to 10 hours. In other embodiments, the temperature is increased from the second temperature to a third temperature with a third dwell time. In at least some of those embodiments, the second temperature is above 400° C. and below a softening point of amorphous glass of the glass bubbles, and the second dwell time is from 1 to 10 hours. The third temperature may be above the softening point of the amorphous glass of the glass bubbles, and the third dwell time may be from 1 to 10 hours.

Other exemplary embodiments include a method of making a porous structure that includes steps of extruding green material, which includes glass bubbles and an organic binder, where most of the glass bubbles survive the extruding without fracture, but then breaching most of the glass bubbles after the extruding, and bonding the plurality of glass bubbles to one another. In aggregate, the bonded, breached glass bubbles form the porous structure. In some embodiments, during the extruding, the glass bubbles have a D50 size of at least 1 micrometer but less than 100 micrometers, such as a D50 size of at least 5 micrometers and no more than 50 micrometers. In some embodiments, after the breaching, the porous structure comprising the breached glass bubbles have a pore size distribution (d50-d10)/d50 of less than 0.8. In some embodiments, during the extruding, the glass bubbles have an isostatic crush strength of 1000 psi or higher. In some embodiments, during the extruding, most of the glass bubbles have a density of at least 0.1 g/cm$^3$ but less than 1.5 g/cm$^3$. In some embodiments, during the extruding, glass of the glass bubbles is soda lime, borosilicate, and/or aluminum silicate.

Still other exemplary embodiments include a method of making a porous structure including steps of extruding green material, which includes glass bubbles and an organic binder, where most of the glass bubbles survive the extruding without fracture; heating the glass bubbles to at least a softening temperature of amorphous glass of the glass bubbles; breaching most of the glass bubbles after the extruding, wherein the breaching includes expanding gasses within the glass bubbles to rupture the glass bubbles; bonding the glass bubbles to one another, wherein the heating is such that adjoining glass bubbles sinter to one another. In aggregate, the bonded, breached glass bubbles form the porous structure, where voids within individual breached glass bubbles open into one another to form cavities that extend through the porous structure and to surfaces thereof. In some such embodiments, the extruded green material floats in water, while the porous structure, which includes the bonded, breached glass bubbles, sinks.

In some embodiments a porous structure includes a plurality of glass bubbles. The glass bubbles are sintered to one another such that adjoining glass bubbles are physically bonded directly to one another. Most of the glass bubbles are breached and voids defined within individual breached glass bubbles open into one another to form cavities that extend through the porous structure and to surfaces thereof. The porous structure has at least 50% porosity in terms of volume. In some such embodiments, at least some of the glass of the glass bubbles is devitrified such that the glass includes crystals. In some embodiments, the porous structure is mostly glass (including devitrified glass), in terms of weight, such as at least 90% of glass, and/or where less than 75% of the porous structure is amorphous phase in terms of weight. In some embodiments, the porous structure has at least 65% and no more than 85% porosity in terms of volume.

In other embodiments a porous structure is mostly (e.g., at least 90%), in terms of weight, a plurality of ruptured glass bubbles sintered to one another such that adjoining glass bubbles are physically bonded directly to one another. Voids defined within individual ruptured glass bubbles open into one another to form cavities that extend through the porous structure and to surfaces thereof. In some such embodiments, the porous structure has a cellular honeycomb geometry with a web thickness of no more than 9 mils, preferably no more than 8 mils, more preferably no more than 6 mils, and a cell density of at most 300 cells per square inch, preferably at most 200 cells per square inch. Other embodiments include a filter that includes such a porous structure and further includes a coating supported by the porous structure, where the coating may be configured to block and/or attract target particulates (i.e. particulate filter), and a housing at least in part surrounding the porous structure and coating.

Still other embodiments include extrusion batch material for making porous structures, which includes a plurality of glass bubbles, where the glass bubbles have a D50 size of at least 1 micrometer and no more than 100 micrometers, and where the glass bubbles have an isostatic crush strength of 1000 psi or higher. The extrusion batch further includes a binder and has a specific gravity with respect to water of less than 1.0. In some embodiments, the extrusion batch further includes a pore former, such as an organic pore former, such as a starch.

Still other embodiments include a porous structure that may be a filter substrate or body (e.g., honeycomb) or may serve other purposes, such has providing support for liquid electrolyte or a skeleton to be infiltrated with a polymer. The structure includes a plurality of glass bubbles having a D50 size of less than 100 micrometers. The glass bubbles are sintered to one another such that adjoining glass bubbles are physically bonded directly to one another. Most of the glass bubbles are breached, and voids defined within individual breached glass bubbles open into one another to form cavities that extend through the structure and to surfaces thereof. In some embodiments, at least some of the glass of the glass bubbles is devitrified such that the glass includes crystals.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE FIGURES

The accompanying Figures are included to provide a further understanding and are incorporated in and constitute a part of this specification. The drawings illustrate one or more embodiments, and together with the Detailed Description explain principles and operations of the various embodiments. As such, the disclosure will become more fully understood from the following Detailed Description, taken in conjunction with the accompanying Figures, in which.

DETAILED DESCRIPTION

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Figures 1, 2:
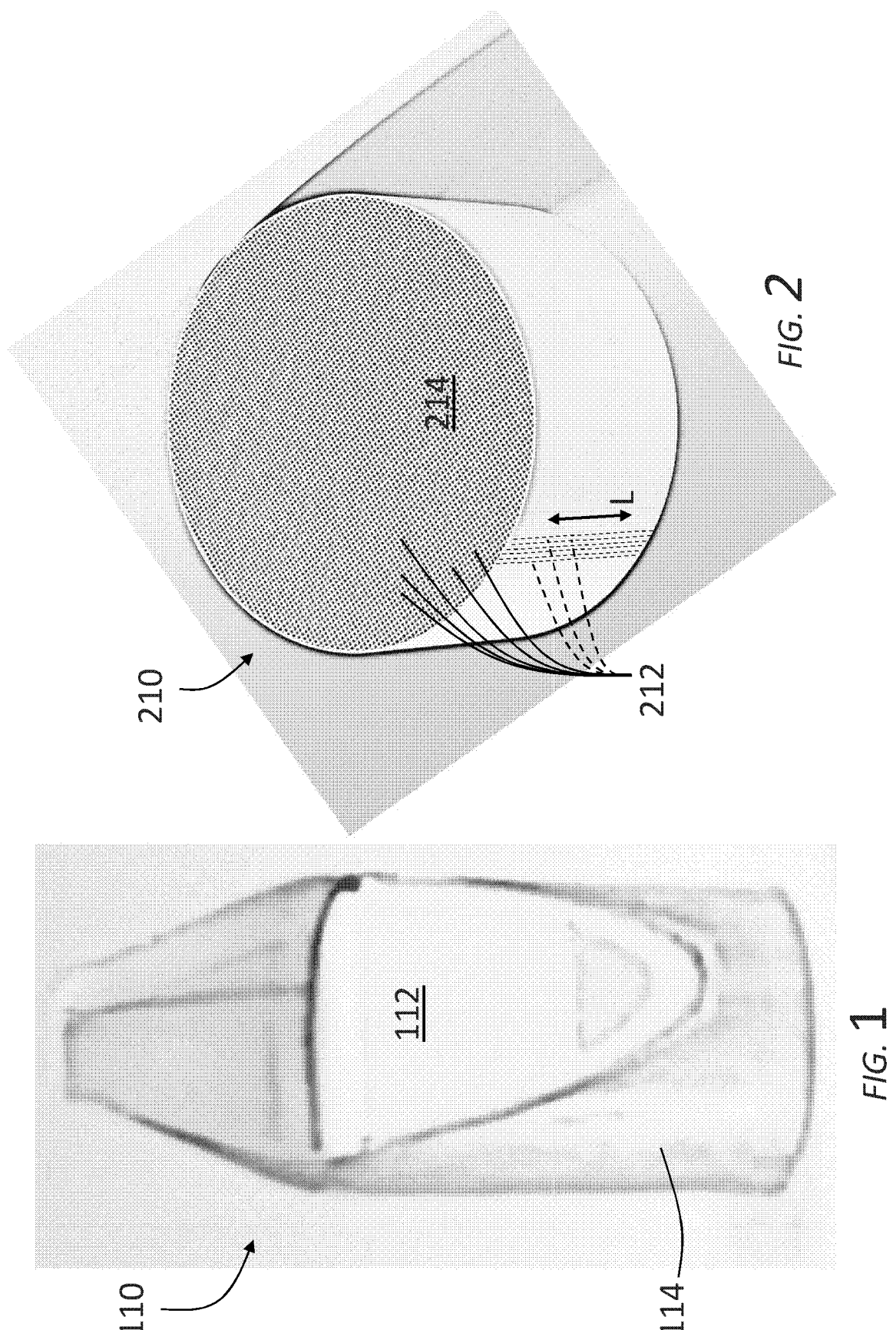
FIG. 1 is a perspective view of a filter in cross section, as may embody technology disclosed herein.
FIG. 2 is a perspective view of a porous structure, such as honeycomb body, as may embody technology disclosed herein.

Referring to FIG. 1, an assembly, shown as a filter 110, includes a porous structure 112 (e.g., substrate, body) in the form of a honeycomb and a housing 114 (e.g., frame), such as metal can. The housing 114 is at least in part surrounding the porous structure 112. More specifically, FIG. 1 shows the housing 114 in cross-section, with a portion removed to show the porous structure 112 within the housing 114. In some embodiments, the porous structure 112 may be coated, such as with a coating configured to attract or otherwise influence target particulates (e.g., exhaust emissions, air particulates, volatile organic compounds). For example, a substrate in a catalytic converter assembly may receive washcoats including aluminum oxide, titanium and silicon dioxides, and may further be coated with catalysts that include precious metals, such as platinum.

Referring to FIG. 2, a porous structure 210, similar to the porous structure 112 of FIG. 1, may be used in a filter 110 or otherwise. The porous structure 210 is a "honeycomb" in that the porous structure 210 includes elongate channels 212 that extend generally through at least a portion of the porous structure 210, such as extending linearly from an outer surface 214 (e.g., face) of the porous structure 210 to or near an opposing outer surface of the porous structure 210. In some embodiments, the filter 110 may include plugs where air flows through walls and webs of the filter, but particulates are caught. In other embodiments, some or all of the elongate channels 212 are unplugged, allowing fluids (e.g., exhaust, water, etc.) to flow through the elongate channels 212. In still other embodiments, the porous structure may be porous but not include elongate channels 212 (see generally FIG. 3).

According to an exemplary embodiment, the elongate channels 212 may have relatively high aspect ratios, such as length-to-width or length-to-diameter, where length L is oriented along the flow path of the elongate channels 212, between openings on the outer surface 214 provided by the elongate channels 212 on opposing outer surfaces 214 of the porous structure 210, as shown in FIG. 2. According to an exemplary embodiment, elongate channels 212 are elongate such that the aspect ratio, defined as the length of an elongate channel 212 in relation to widest cross-sectional dimension of the respective elongate channel 212 orthogonal to the length L, of at least some of (e.g., most, >90%, all) the channels is at least ten, at least twenty, at least fifty, at least one-hundred, and/or no more than 50,000.

While FIGS. 1-2 show porous structures 112, 210 having a generally cylindrical geometry, other geometries are contemplated, such as cube, box, sheet, and more complex geometries. For example, referring now to FIG. 3, structure 310 is generally a rectilinear sheet, which may be used as a filter substrate or for other purposes. In some embodiments, the structure 310 of FIG. 3 has a generally uniform density and heterogeneous pore distribution, essentially a sheet of glass foam, without elongate channels. The foam may be highly porous, coated, and/or partially- or fully-filled with liquid material (e.g., electrolyte), solid material (e.g., dielectric), or otherwise.

According to an exemplary embodiment, the structure 310 is highly porous, and the pores (e.g., cavities, voids, space between structure) are open to one another such that fluids may pass through the pores, into and through the structure 310. However, the structure 310 may be only semi-permeable, in some such embodiments, allowing only some fluids and/or smaller particulates to pass through the structure 310, but trapping or blocking others.

Figure 3:
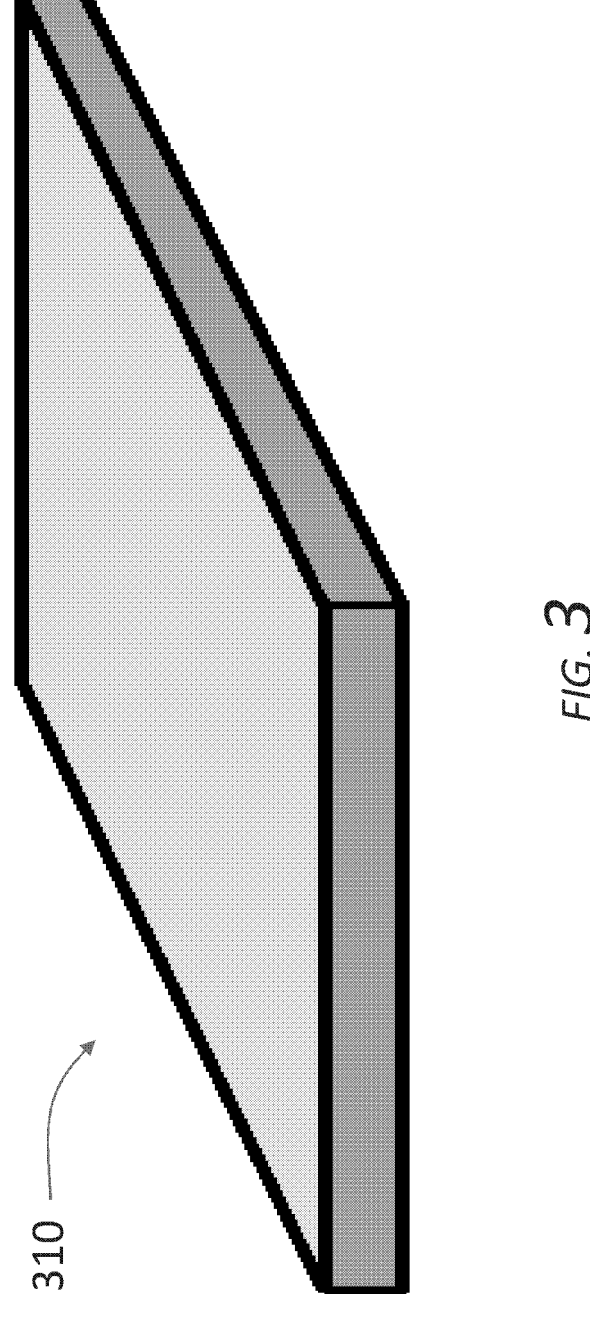
FIG. 3 is a perspective view of another structure as may embody technology disclosed herein.

According to an exemplary embodiment, structures, such as the porous structures 112, 210 and structure 310 of FIGS. 1-3, may include and/or be at least partially formed from a plurality of glass bubbles (e.g., hollow microspheres, see glass bubbles 512, 512' of FIGS. 5 and 7), where "plurality" may include more than 100, such as more than 1000. In some such embodiments, the glass bubbles have a D50 size of at least 1 micrometer (μm) and no more than 1000 μm, such as at least 5 μm, at least 25 μm, and/or no more than 500

μm, such as no more than 250 μm, such as no more than 100 μm, as per ASTM standards, such as D4284-12. In some such embodiments, the porous structures including the glass bubbles have a pore size distribution (d50–d10)/d50 of less than 0.8, such as less than 0.4, such as less than 0.2, such as less than 0.1, such as less than 0.06. In some such embodiments, most of the glass bubbles (prior to breach, as discussed below) have a density of at least 0.1 g/cm³, such as at least 0.3 g/cm³, and/or less than 1.5 g/cm³, such as less than 0.7 g/cm³, where density accounts for mass per volume, including interior bubble volume.

According to an exemplary embodiment, the porous structures 112, 210, and the structure 310, in terms of weight, are mostly glass or crystallized glass (glass-ceramic, ceramic), such as at least 70% of the weight, such as at least 80%, and such as at least 90%. Such large portions of the structures 112, 210, 310 formed from glass or crystallized glass of glass bubbles may be surprising or counterintuitive for those in industry because they may expect such structures to be particularly fragile and/or not hold together at all. However, in some contemplated uses, porous space of the porous structures 112, 210, and structure 310 may later be at least partially filled by other materials (e.g., fluids), while the porous structures 112, 210 and structure 310 largely hold together due to methods of making such structures as taught herein.

Figure 4:
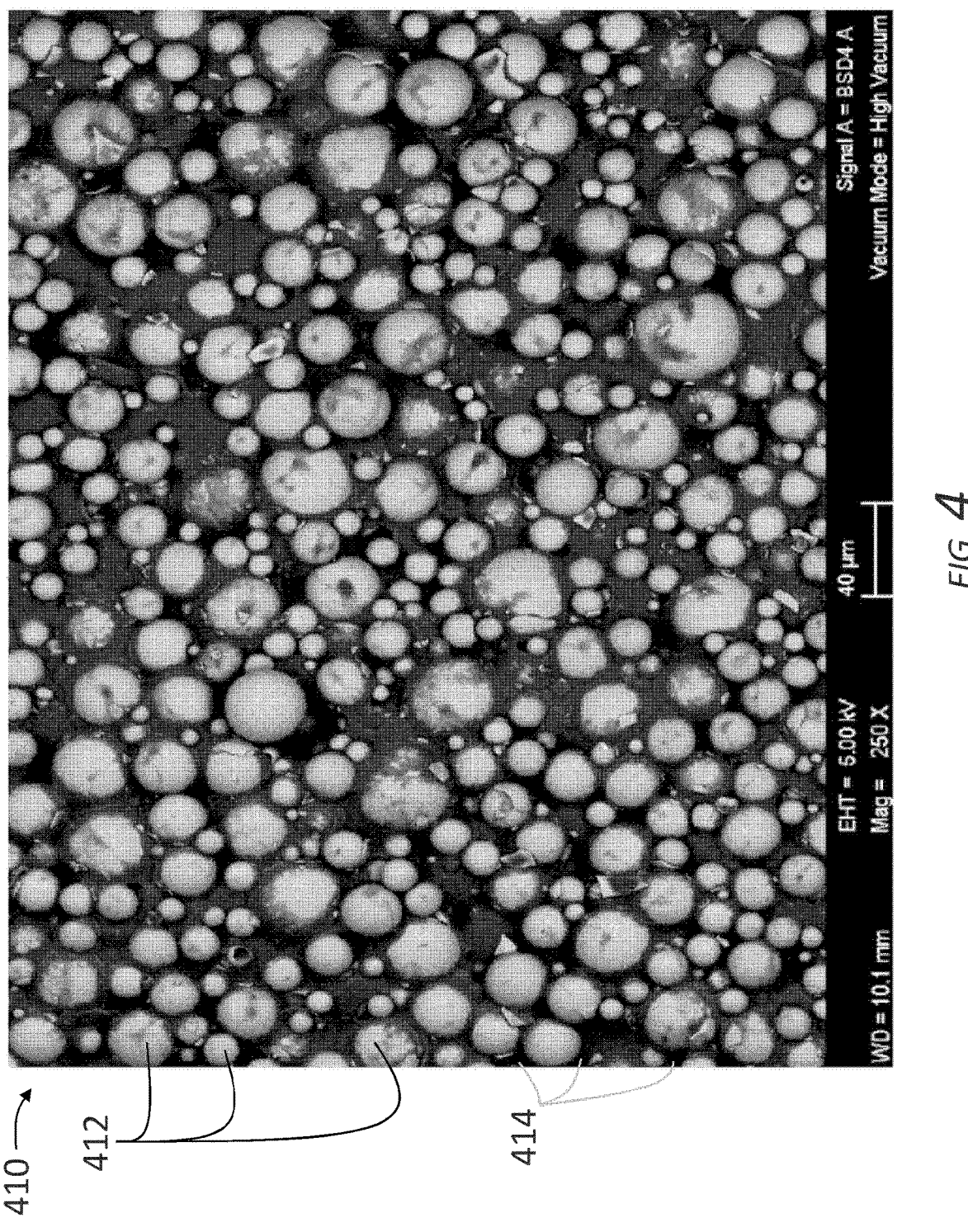
FIG. 4 is a micrograph of a green structure that includes glass bubbles according to an exemplary embodiment.
Figure 5:
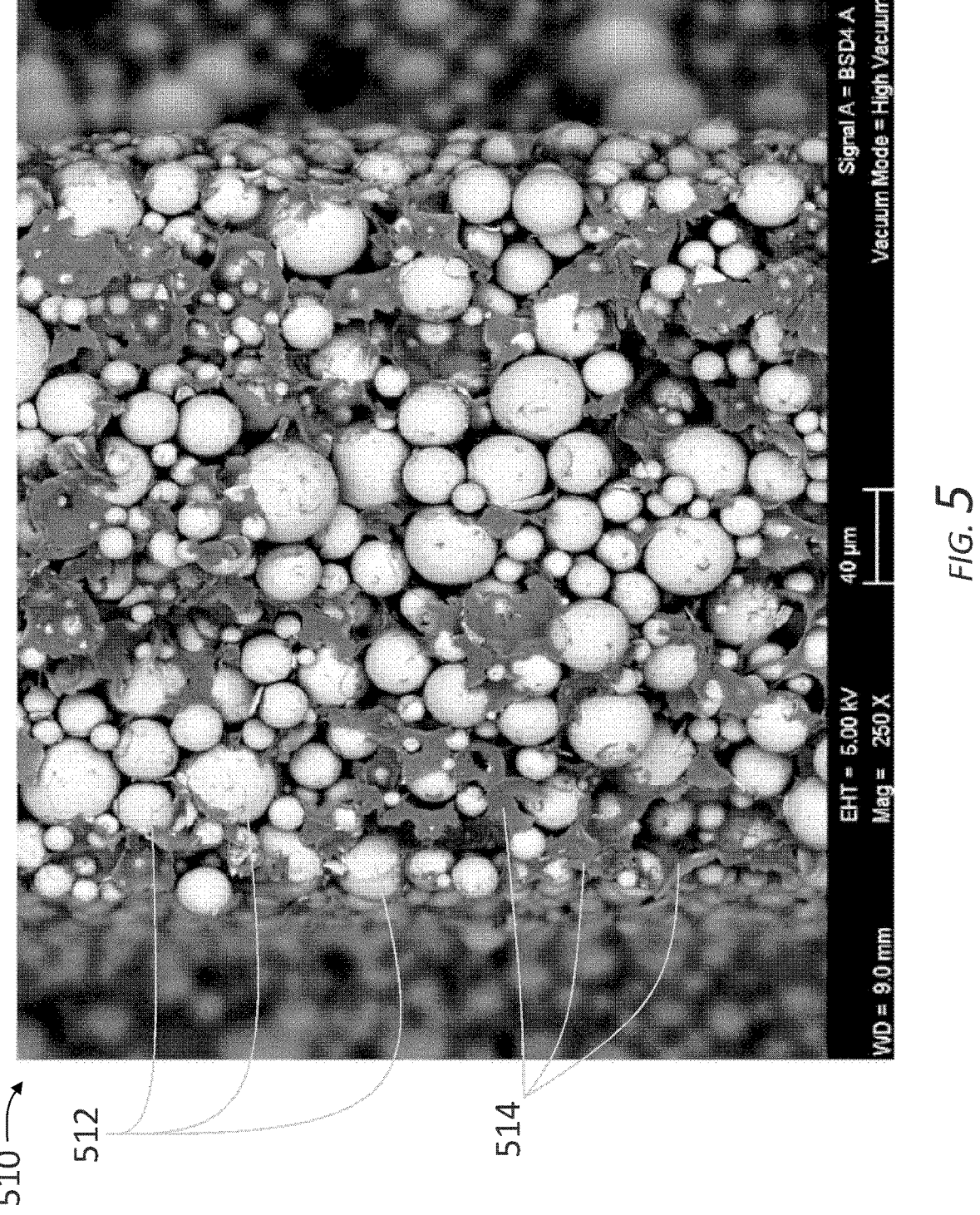
FIG. 5 is a micrograph of a green structure that includes glass bubbles according to another exemplary embodiment.

FIGS. 4-5 include "green" (e.g., pre-fired, pre-sintered) structures 410, 510. More specifically, green structure 410 of FIG. 4 may be an exterior wall of a porous structure, such as a honeycomb porous structure as shown in FIG. 1. While green structure 510 of FIG. 5 may be an interior wall or web of a porous structure, such as a honeycomb body as shown in FIG. 1.

The green structures may be formed from extruded batch material. According to an exemplary embodiment, the green structures 410, 510 include glass bubbles 412, 512 held in binder 414, 514 (e.g., organic binder, mostly-organic binder). In some embodiments, the batch material may include glass bubbles of particle size 3 to 100 micrometers, such as having a particle distribution of (d90–d10)/d90 less than 2, such as less than 1.5, or less than 1. According to an exemplary embodiment, the batch density (e.g., "wet batch" density) is less than 1.5 g/cm³, such as less than 1.0 g/cm³, such as less than 0.5 g/cm³, such as less than 0.3 g/cm³. According to an exemplary embodiment, the green material and batch material float (i.e. specific gravity less than 1, compared to water) of FIGS. 4-5, while finished porous structures, after firing and/or breaching of the glass bubbles, may sink (see FIGS. 6-7).

In some embodiments, the green structures 410, 510 may further include a slip agent and/or lubricant, such as oil. Sodium stearate or another sintering aid may be added to the batch. In some embodiments, the binder may include methylcellulose. In some embodiments, the batch may further include a pore former, such as an organic pore former, such as a starch (e.g., corn starch, pea starch). According to an exemplary embodiment, glass bubbles 412, 512 may be a "stand-alone" composition in terms of the inorganic constituents (>90% wt of inorganics in the batch, >95% wt, skeleton). In other embodiments, the batch may further include a second inorganic material with a softening temperature greater than the glass bubbles, such as clay, talc, silica, alumina, minerals, synthetic oxides, other types of glass or ceramic particles and/or bubbles.

In some embodiments, particularly resilient glass bubbles 412, 512 are used, such as those having a mean isostatic crush strength of at least 1000 psi, such as at least 2000 psi, such as at least 3000 psi (see Measuring Isostatic Pressing Strength of Hollow Glass Microspheres by Mercury-injection Apparatus by Yun and Shou, Key Engineering Materials, vol. 544, pp. 460-5 (2013)). Also, rates and pressures through the corresponding extruder may vary depending upon the size of the glass bubbles, their material, and the extruding device. In some embodiments, extrusion pressures are in the range of less than 2500 psi, such as less than 2000 psi, and/or at least 500 psi.

According to an exemplary embodiment, the glass bubbles 412, 512 in binder 414, 514 have been extruded (e.g., twin-screw) at a rate and pressure to preserve integrity of most (e.g., more than 50%, more than 75%, more than 90%) of the glass bubbles 412, 512. As shown in FIGS. 4-5, most of the glass bubbles 412, 512 appear fully intact. With that said, in other contemplated embodiments, extrusion rate and pressure may preserve integrity of many of the glass bubbles 412, 512, but not most, such as less than 50%, but at least 25%, or at least 20%. Preserving integrity of the glass bubbles 412, 512 allows the glass bubbles to occupy relatively large volumes of space within the green structures 410, 510 with voids between the glass bubbles 412, 512 and within the glass bubbles 412, 512.

Extruding the green structures 410, 510 may be particularly efficient for forming through-channels (e.g., elongate channels 212 as shown in FIG. 2) in porous structures such as the honeycomb of FIG. 1, or other regular features in the respective green structures 410, 510. However, in other bubbles, such as glass bubbles including more than 45% $SiO_2$ and/or $CaSiO_3$, etc. by weight, facilitate transformation processes from internal porosity to open connected porosity, as discussed below. Exemplary glass composition constituents include more than 74% $SiO_2$, more than 6.5% CaO, less than 7% and at least some $B_2O_3$, less than 1% and at least some $Al_2O_3$, at least some $Fe_2O_3$, less than 2.5% and at least some $Na_2O$, and/or at least some $K_2O$. In some embodiments, glass of the glass bubbles is, is mostly, or includes soda lime, borosilicate, and/or aluminum silicate glass. Some exemplary compositions and corresponding glass bubble attributes are provided in Tables 1 and 2 below:

TABLE 1

| Exemplary glass bubble compositions | | | | | | | |
|---|---|---|---|---|---|---|---|
| Sample | A1 | A2 | A3 | A4 | A5 | B1 | B2 |
| $SiO_2$ | 79.4 | 79.3 | 79.3 | 79.3 | 79.5 | 73.6 | 71.1 |
| CaO | 7.72 | 7.43 | 7.43 | 7.43 | 7.89 | 6.19 | 5.67 |
| $B_2O_3$ | 5.95 | 5.95 | 5.95 | 5.95 | 5.09 | 7.38 | 8.73 |
| $Al_2O_3$ | 0.52 | 0.55 | 0.55 | 0.55 | 0.49 | 1.01 | 1.07 |
| $Fe_2O_3$ | 0.057 | 0.056 | 0.056 | 0.056 | 0.035 | 0.089 | 0.081 |
| NaO | 1.68 | 1.59 | 1.59 | 1.59 | 1.74 | 2.58 | 2.60 |
| $K_2O$ | 0.14 | 0.14 | 0.14 | 0.14 | 0.14 | 0.19 | 0.21 |

TABLE 2

| Attributes of glass bubbles | | | | | | | |
|---|---|---|---|---|---|---|---|
| Sample | A1 | A2 | A3 | A4 | A5 | B1 | B2 |
| Softening temp. (° C.) | ~800 | ~800 | ~800 | ~800 | ~800 | ~600 | ~600 |
| Density (g/cm$^3$) | 0.38 | 0.60 | 0.64 | 0.55 | 0.48 | 0.45 | 0.34 |
| Porosity (%) | 82.9 | 73.1 | 71.3 | 75.3 | 78.4 | 79.8 | 84.8 |
| Shell Thickness (μm) | 1.07 | 1.45 | 1.18 | 1.76 | 0.91 | 0.70 | 1.24 |
| Particle Size $D_{10}$ (μm) | 21.1 | 17.0 | 15.2 | 27.9 | 15.0 | 10.5 | 21.9 |
| Particle Size $D_{50}$ (μm) | 35.5 | 28.7 | 22.2 | 39.1 | 23.4 | 19.2 | 35.1 |
| Particle Size $D_{90}$ (μm) | 58.3 | 58.9 | 33.5 | 58.9 | 37.0 | 35.4 | 55.4 |
| Distribution ($D_{90}$-$D_{10}$)/$D_{50}$ | 1.05 | 1.45 | 0.83 | 0.79 | 0.94 | 1.30 | 0.95 |
| Crush strength (psi) | 3000 | 10000 | | | 4000 | 3000 | 4000 | contemplated embodiments, such structures, including glass bubbles in binder may be molded, tape-cast, or otherwise shaped or processed, which may better or alternatively preserve integrity of the glass bubbles 412, 512. In still other contemplated embodiments, structures with shapes far different from those of porous structures 112, 210, such as the structure 310, may be extruded or otherwise formed.

The glass bubbles 412, 512 may include glass (e.g., consist of, consist mostly of by volume, comprise), such as soda lime glass, borosilicate, or other glasses. The glass of the glass bubbles 412, 512 may be fully amorphous, crystalline, polycrystalline, etc., such as two-phase glass-ceramic. In some embodiments, the glass of the glass bubbles 412, 512 may be amorphous prior to heating, and subsequently may devitrify and/or crystallize. For clarity, "glass" as used herein includes amorphous glass, devitrified glass with crystals, such as glass-ceramic and crystalline phase. In at least some contemplated embodiments, the glass bubbles 412, 512 may include and/or be formed form other materials, such as synthetic minerals, polymers, ceramics, fly ash/cenospheres, metals, etc.

According to an exemplary embodiment, glass bubbles with high crystallinity at softening temperatures of the glass According to an exemplary embodiment, the green structures 410, 510 are heated (e.g., fired in a furnace, laser heated). Heating may burn out, char, chemically transform, or otherwise influence the binder 414, 514. According to an exemplary embodiment, the green structures 410, 510 are heated at least to a softening temperature of glass of the glass bubbles 412, 512. But, the glass bubbles 412, 512 are not overheated, such as well above a liquidus temperature, where the glass bubbles 412, 512 may fully lose cohesion or structure. Depending upon the materials, the heating may be to at least 400° C., at least 600° C., at least 800° C., at least 1200° C., and/or no more than 2000° C., such as no more than 1600° C., such as no more than 1400° C. In contemplated embodiments, the glass bubbles 412, 512 may have other softening temperatures.

According to an exemplary embodiment, conditions and handling of the green structures 410, 510 during the heating is such that adjoining glass bubbles 412, 512 physically interact with one another, such as directly bond to one another (e.g., sinter, weld, melt-into), but without fully losing their individual structures. Put another way, in at least some such embodiments, the conditions and handling are such that the glass bubbles 412, 512 do not fully liquify and/or completely lose structure, and instead become bonded to one another such that, in the aggregate, the resulting structure is cohesive and rigid.

According to a further such exemplary embodiment, conditions and handling of the green structures 410, 510 during the heating may be such that many (e.g., most, >90%, >95%, >99%) of the glass bubbles 412, 512 breach or break, such as by rupture from internal gas expansion and/or by devitrification or otherwise. In some such embodiments, the glass bubbles 412, 512 are heated to a point that the glass bubbles 412, 512 lose integrity and glass of the glass bubbles 412, 512 shatters or is otherwise breached. In other contemplated embodiments, the glass bubbles may be breached by microwaves, sound, or other phenomena.

Breaching the glass bubbles 412, 512 may be counterintuitive to those in industry, where glass bubbles may be relied upon to provide buoyancy and/or prevent inflow of materials into voids within the glass bubbles or through the glass bubbles. However, Applicants have found that by breaching the glass bubbles 412, 512 of structures, as disclosed herein, voids of the glass bubbles 412, 512 may be maintained and/or even enlarged and joined to one another.

Following heating, the green structures 410, 510 may be cooled, such as to a temperature at least 100° C. less than the temperatures to which the green structures 410, 510 were heated, such as to less than 100° C., such as less than 50° C. During the cooling, the adjoining glass bubbles 412, 512, which may be less spherical at this point, are and/or remain physically bonded to one another, such as directly or indirectly bonded, with intermediate bonding agents.

In some such embodiments, the cooling includes dwelling at temperatures above room temperature (e.g. at annealing point of the glass of the glass bubbles), but below the heating temperature. Dwelling may occur at incremental steps, in some embodiments, or may be in the form of very gradual temperature declines within certain temperature ranges in other embodiments, both of which may allow for formation of crystals in the materials of the glass bubbles 412, 512, and/or may facilitate relaxing of residual stresses by to annealing.

Similarly, Applicants have discovered a unique firing process to breach/open the glass bubbles. During the heating, the glass bubbles may be heated from ambient temperature to a first temperature(s) (e.g., fixed temperature and/or temperatures in a limited range) with a first dwell time, such as where the first temperature(s) is at least 200° C., such as from 300° C. to 400° C., and/or where the first dwell time is at least 1 minute, such as from 1 to 10 hours. In some such embodiments, the temperature is then increased from the first temperature to a second temperature(s) with a second dwell time, such as where the second temperature(s) is greater than 400° C., such as from 600° C. to 1200° C., and where the second dwell time is also at least 1 minute, such as from 1 to 10 hours. In some embodiments, during the heating, the temperature is increased from the second temperature(s) to a third temperature(s) with a third dwell time, such as where the second temperature is above 400° C. and below a softening point of glass of the glass bubbles 412, 512 and the third temperature is above the softening point of the glass of the glass bubbles. The third dwell time may be at least 1 minute, such as from 1 to 10 hours.

Figure 6:
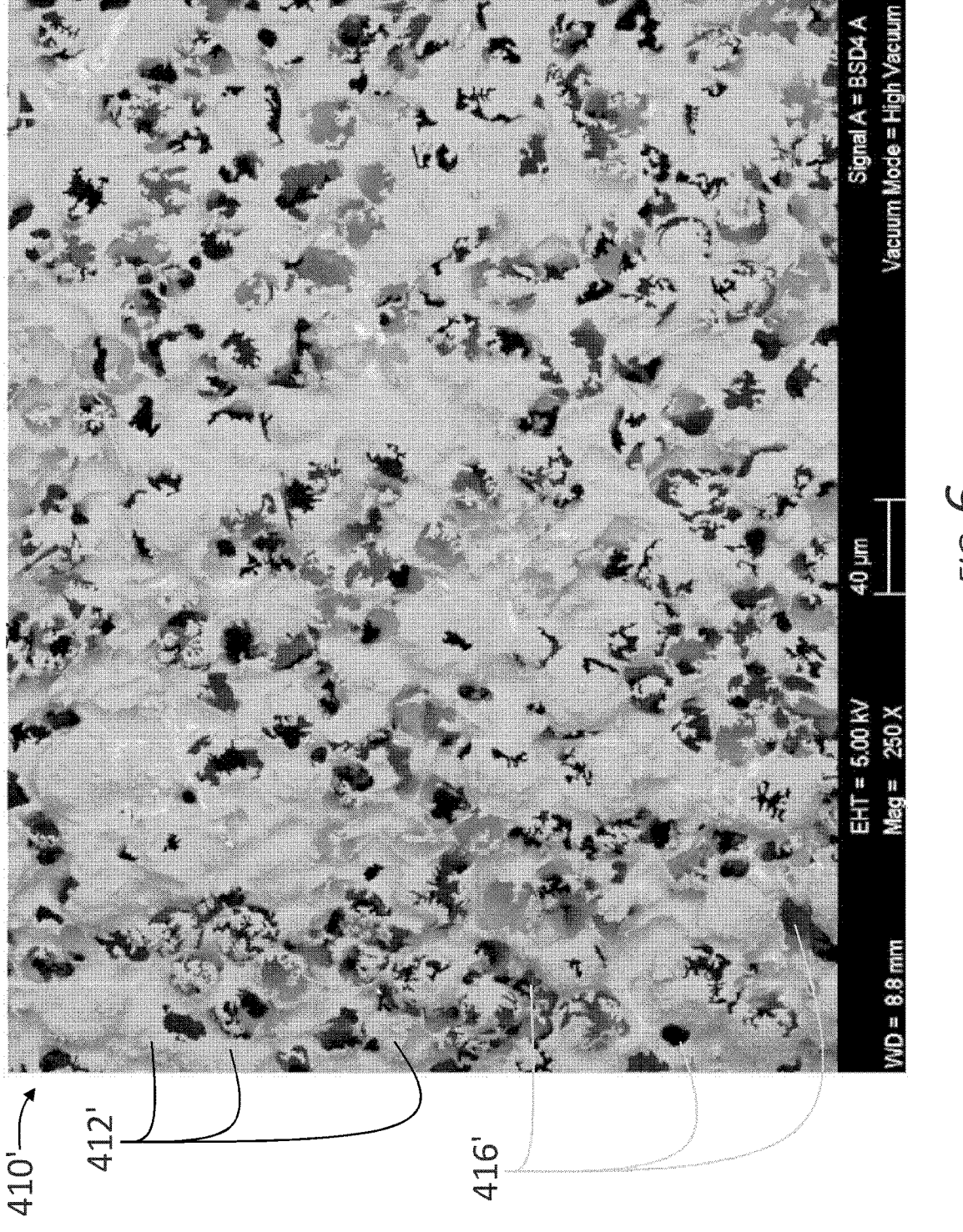
FIG. 6 is a micrograph of a structure similar to that of FIG. 4, but with the glass bubbles ruptured and devitrified, according to an exemplary embodiment.
Figure 7:
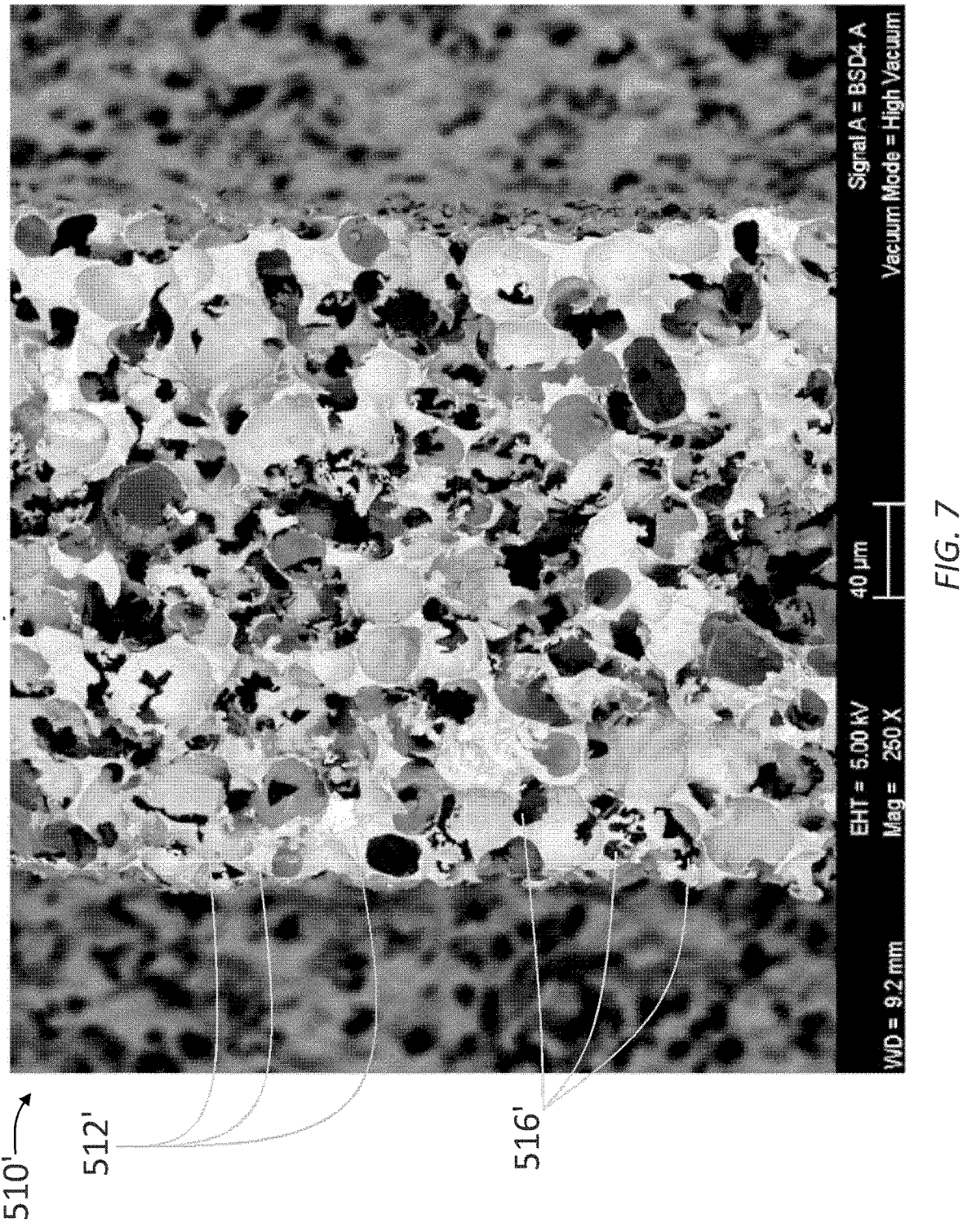
FIG. 7 is a micrograph of a structure similar to that of FIG. 5, but with the glass bubbles ruptured and devitrified, according to an exemplary embodiment.

Referring now to FIGS. 6-7, structures 410', 510' of FIGS. 6-7 are related to the green structures 410, 510. More specifically, structure 410' of FIG. 6 may be an exterior wall of a porous structure, such as a honeycomb as shown in FIG. 1 and structure 510' of FIG. 7 may be an interior wall or web of a porous structure, such as a honeycomb as shown in FIG.

1. However, structures 410', 510' are not "green" structures. Instead, shells or husks of glass bubbles 412', 512' are bonded to one another and the glass bubbles 412', 512' are breached, where interior volumes of the glass bubbles 412', 512' are exposed and spaces between the glass bubbles 412', 512' are open and interconnected with one another, forming cavities 416', 516' (tortuous pathways) extending throughout and to surfaces of the structures 410', 510'.

Referring to FIGS. 6-7, internal walls formed between pores within the structures 112, 210, 310 may be particularly thin, such as less than 1 millimeters (mm) in thickness, such as less than 500 micrometers (μm), such as less than 100 μm, such as less than 50 μm, such as less than 10 μm, such as less than 5 μm in some contemplated embodiments, such as where particularly small glass bubbles are used, as discussed below.

As may be seen in FIGS. 6-7, in some embodiments, glass of the glass bubbles 412', 512' devitrifies and forms crystals. In FIGS. 6-7, the devitrified glass appears light gray. Gradually heating, and dwelling, as disclosed herein, may facilitate crystal growth, which may toughen the resulting structures 410', 510'. While green material may include amorphous glass bubbles, the processed structures, after firing, may be a glass-ceramics with crystallinity over 45% by weight (e.g., at least 50% wt; e.g., 64% wt crystallinity). In some embodiments, the porous structure (after firing), in terms of weight, consists mostly of glass (including devitrified glass), such as consisting at least 90% of glass. In some such embodiments, the porous structure consists less than 55% of amorphous phase by weight. As may be seen in FIG. 6, white needle-like structures on as-fired surface may be tridymite crystals.

Referring to FIG. 7, the cavities 416', 516' formed by the breached glass bubbles 412', 512' and/or voids left behind from burned-out binder (see binder 414, 514 of FIGS. 4-5) may lead to particularly high porosity of resulting structures 410', 510'. Applicants believe that the presently disclosed technology provides for high porosity, such as at least 40%, at least 60%, at least 70%, at least 80% by volume (see ASTM D6761-07). According to an exemplary embodiment, the porous structures 112, 210, and structure 310 have at least 65% and/or no more than 85% porosity in terms of volume.

While FIGS. 4-7 show microstructure and surface features, according to at least some exemplary embodiments, porous structures 112, 210, and structure 310 may have a total volume, within outer surfaces thereof (see, e.g., outer surface having the openings on outer surface 214 of FIG. 2), of at least 1 cubic centimeter (cm³), such as at least 2 cm³, such as at least 10 cm³, such as at least 50 cm³, and/or no more than 2000 cm³, such as no more than 1000 cm³; but in other embodiments, the volume may be much larger, such as for large frontal area filters.

In contemplated embodiments, processes and technology disclosed herein are used with honeycomb filters, such as diesel engine particulate filters. Glass bubbles are selected with sufficient crush strength and small enough geometry to facilitate extrusion of honeycomb bodies having at least 50 cells per square inch, such as at least 100 cells per square inch, such as at least 200 cells per square inch, such as at least 300 cells per square inch, and/or web thickness of no more than 10 mils (i.e. thousandths of an inch), such as no more than 8 mils, such as no more than 7 mils, such as no more than 6 mils, such as no more than 5 mils, such as for example cell geometries at, at least as dense as, no denser than, or about 200/8 cells per square inch over web thickness in mils, 400/7, 400/6, 400/5, 400/4, 400/3, 400/2, 300/7, 300/6, 300/5, 300/4, 300/3, 300/2, 200/7, 200/6, 200/5, 200/4, 100/8, 100/7, 100/6, 100/5, 50/8, 50/7, 50/6, etc.

At least some such embodiments have a cylindrical geometry, with a diameter of at least 4 inches, such as at least 6 inches, such as at least 8 inches, such as at least 12 inches, such as at least 24 inches, and/or no more than 64 inches, such as no more than 36 inches. Other such embodiments have a generally square, rectangular, or other polygonal geometry in cross-section, with sides of at least 4 inches, such as at least 6 inches, such as at least 8 inches, such as at least 12 inches, such as at least 24 inches, and/or no more than 64 inches, such as no more than 36 inches. Other contemplated embodiments have other sizes or shapes. Such geometries may facilitate low pressure drop, high dust loading, and high filtration efficiency.

Construction and arrangements of the porous structures, assemblies, and structures, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A method of making a porous structure configured for use in a particulate filter, comprising:
bonding a plurality of glass bubbles to one another, wherein the glass bubbles have a D50 particle size of at least 1 micrometer but no more than 100 micrometers, wherein the plurality comprises at least 1000 of the glass bubbles;
heating the plurality of glass bubbles to at least a softening temperature of the glass bubbles; and
breaching the glass bubbles, wherein the breaching occurs concurrently with the heating;
wherein, in aggregate, the bonded, breached glass bubbles form the porous structure, and wherein voids within individual breached glass bubbles open into one another to form cavities that extend through the porous structure and to surfaces thereof.

2. The method of claim 1, further comprising devitrifying at least some glass of the glass bubbles to form crystals.

3. The method of claim 2, wherein the breaching includes flowing amorphous glass of the glass bubbles relative to the crystals.

4. The method of claim 2, wherein the devitrifying occurs during the heating.

5. The method of claim 4, wherein the devitrifying results in the porous structure having over 45% crystallinity by weight.

6. The method of claim 1, wherein the heating is such that adjoining glass bubbles sinter to one another.

7. The method of claim 1, further comprising cooling the plurality of bonded, breached glass bubbles.

8. The method of claim 1, further comprising, prior to the heating, extruding green material comprising the glass bubbles and an organic binder, wherein most of the glass bubbles survive the extruding without fracturing.

9. The method of claim 8, wherein the extruding comprises extruding thousands of the glass bubbles coupled to one another with the organic binder.

10. The method of claim 9, wherein the heating burns out or chemically changes most of the organic binder in terms of weight.

11. The method of claim 1, wherein, during the heating, before reaching the softening temperature, the glass bubbles are heated to a first temperature range for a first dwell time, and then the heated to a second temperature range for a second dwell time;
wherein the first temperature range is from 300° C. to 400° C.; and
wherein the first dwell time is in a range from 1 to 10 hours.

12. The method of claim 11, wherein, during the heating, the second temperature range is from 600° C. to 1200° C.; and
wherein the second dwell time is in a range from 1 to 10 hours.

13. The method of claim 11, wherein, during the heating, the second temperature range is above 400° C. and below the softening temperature of the glass bubbles;
wherein the second dwell time is in a range from 1 to 10 hours;
wherein, during the heating, the glass bubbles are heated to a third temperature range for a third dwell time;
wherein the third temperature range is lower-bounded by the softening temperature of the glass bubbles; and
wherein the third dwell time is in a range from 1 to 10 hours.

14. The method of claim 1, wherein the glass bubbles comprise more than 6.5% CaO by weight.

15. The method of claim 14, wherein the composition of the glass bubbles further comprises greater than 0 but less than 7% $B_2O_3$ by weight, greater than 0 but less than 1% $Al_2O_3$ by weight, and greater than 0 but less than 2.5% $Na_2O$ by weight.

16. The method of claim 1, wherein the glass bubbles have a D50 particle size of at least 1 micrometer but less than 40 micrometers.

17. The method of claim 1, wherein the glass bubbles have a composition that comprises more than 74% $SiO_2$ by weight.

* * * * *